United States Patent
De Los Reyes et al.

(10) Patent No.: US 8,390,593 B2
(45) Date of Patent: Mar. 5, 2013

(54) CLICK DISAMBIGUATION ON A TOUCH-SENSITIVE INPUT DEVICE

(75) Inventors: Andrew De Los Reyes, Belmont, CA (US); Ryan Tabone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/447,118

(22) Filed: Apr. 13, 2012

(65) Prior Publication Data
US 2012/0262400 A1    Oct. 18, 2012

Related U.S. Application Data

(60) Provisional application No. 61/475,213, filed on Apr. 13, 2011.

(51) Int. Cl.
*G06F 3/041* (2006.01)
(52) U.S. Cl. .................... 345/173; 345/156; 345/169
(58) Field of Classification Search .................. 345/156, 345/173–181
See application file for complete search history.

(56) References Cited

U.S. PATENT DOCUMENTS

| 6,208,329 | B1 | 3/2001 | Ballare |
| 7,719,522 | B2 * | 5/2010 | Lyon et al. .................... 345/173 |
| 7,956,847 | B2 * | 6/2011 | Christie ........................ 345/173 |

FOREIGN PATENT DOCUMENTS
WO    WO 2007/014082 A2    2/2007

* cited by examiner

*Primary Examiner* — Duc Dinh

(57) ABSTRACT

The surface of an touch-sensitive input device may act as a physical button that the user may push down to perform a click or other operation. For example, the user may push down the surface of the input device with one finger for a left click and push down the surface of the input device with two fingers for a right click. In one aspect, a system for detecting a left click or a right click when the user pushes down the surface of the input device is provided. When the system first detects that the surface of the input device is pushed down, the system may wait for a short period of time before making a determination of whether the user is pushing down the surface with one finger or two fingers. During this time, the system may collect additional information to make a more reliable determination.

15 Claims, 4 Drawing Sheets

US 8,390,593 B2

CLICK DISAMBIGUATION ON A TOUCH-SENSITIVE INPUT DEVICE

CROSS-REFERENCE TO RELATED APPLICATION

This application claims the benefit of U.S. Provisional Patent Application No. 61/475,213, filed Apr. 13, 2011, entitled "CLICK DISAMBIGUATION ON A TOUCH-SENSITIVE INPUT DEVICE," the disclosure of which is hereby incorporated by reference in its entirety for all purposes.

BACKGROUND

The present disclosure generally relates to clicking on a touch-sensitive input device.

A user may input commands to a computing system (e.g., laptop) via a touch-sensitive input device (e.g., touch pad). For example, the user may move a finger across the surface of the input device to scroll a page or move a pointer displayed on the computing system. In another example, the user may perform a click by pressing down the surface of the touch-sensitive input device with one or more fingers.

SUMMARY

The surface of an touch-sensitive input device may act as a physical button that the user may push down to perform a click or other operation. For example, the user may push down the surface of the input device with one finger for a left click and push down the surface of the input device with two fingers for a right click.

In one aspect of the present disclosure, a system for detecting a left click or a right click when the user pushes down the surface of the input device is provided. When the system first detects that the surface of the input device is pushed down, the system may wait for a short period of time before making a determination of whether the user is pushing down the surface of the input device with one finger or with two fingers. During this period of time, the system may collect additional information to make a more reliable determination.

In another aspect of the present disclosure, a computer-implemented method of reporting button actions generated using a touch-sensitive input device is provided. The method includes the steps of determining that a surface of the touch-sensitive input device is pushed down, detecting a number of fingers on the surface of the touch-sensitive input device after the surface is pushed down, and reporting, in a case where the number of fingers detected on the surface of the touch-sensitive input device is two, a right button down. The method also includes the steps of waiting, in a case where the number of fingers detected on the surface of the touch-sensitive input device is one, until a period of time has elapsed or the surface is no longer pushed down, and reporting the button actions based on the number of fingers detected on the surface of the touch-sensitive input device during or after the step of waiting.

In a further aspect of the present disclosure, a machine-readable storage medium comprising machine-readable instructions for causing a processing unit to execute a method of reporting button actions generated using a touch-sensitive input device is provided. The method includes the steps of determining that a surface of the touch-sensitive input device is pushed down, detecting a number of fingers on the surface of the touch-sensitive input device after the surface is pushed down, and reporting, in a case where the number of fingers detected on the surface of the touch-sensitive input device is two, a first button action. The method also includes the steps of waiting, in a case where the number of fingers detected on the surface of the touch-sensitive input device is one, until a period of time has elapsed or the surface of the touch-sensitive input device is no longer pushed down, and reporting the button actions based on the number of fingers detected on the surface of the touch-sensitive input device during or after the step of waiting.

In yet another aspect of the present disclosure, a system for reporting gestures corresponding to use of a touch-sensitive input device is provided. The system includes the touch-sensitive input device and a processing unit. The processing unit is configured to determine that a surface of the touch-sensitive input device is pushed down, to detect a number of fingers on the surface of the touch-sensitive input device after the surface is pushed down, and to report, in a case where the number of fingers detected on the surface of the touch-sensitive input device is two, a first gesture. The processing unit is also configured to wait, in a case where the number of fingers detected on the surface of the touch-sensitive input device is one, until a period of time has elapsed or the surface is no longer pushed down, and to report the gestures based on the number of fingers detected on the surface of the touch-sensitive input device during or after the step of waiting.

Additional features and advantages of the invention will be set forth in the description below, and in part will be apparent from the description, or may be learned by practice of the invention. The advantages of the invention will be realized and attained by the structure particularly pointed out in the written description as well as in the appended drawings.

DETAILED DESCRIPTION

In the following detailed description, numerous specific details are set forth to provide a full understanding of the present disclosure. It will be apparent, however, to one ordinarily skilled in the art that aspects of the present disclosure may be practiced without some of these specific details. In other instances, well-known structures and techniques have not been shown in detail so as not to obscure the disclosure.

Figure 1:
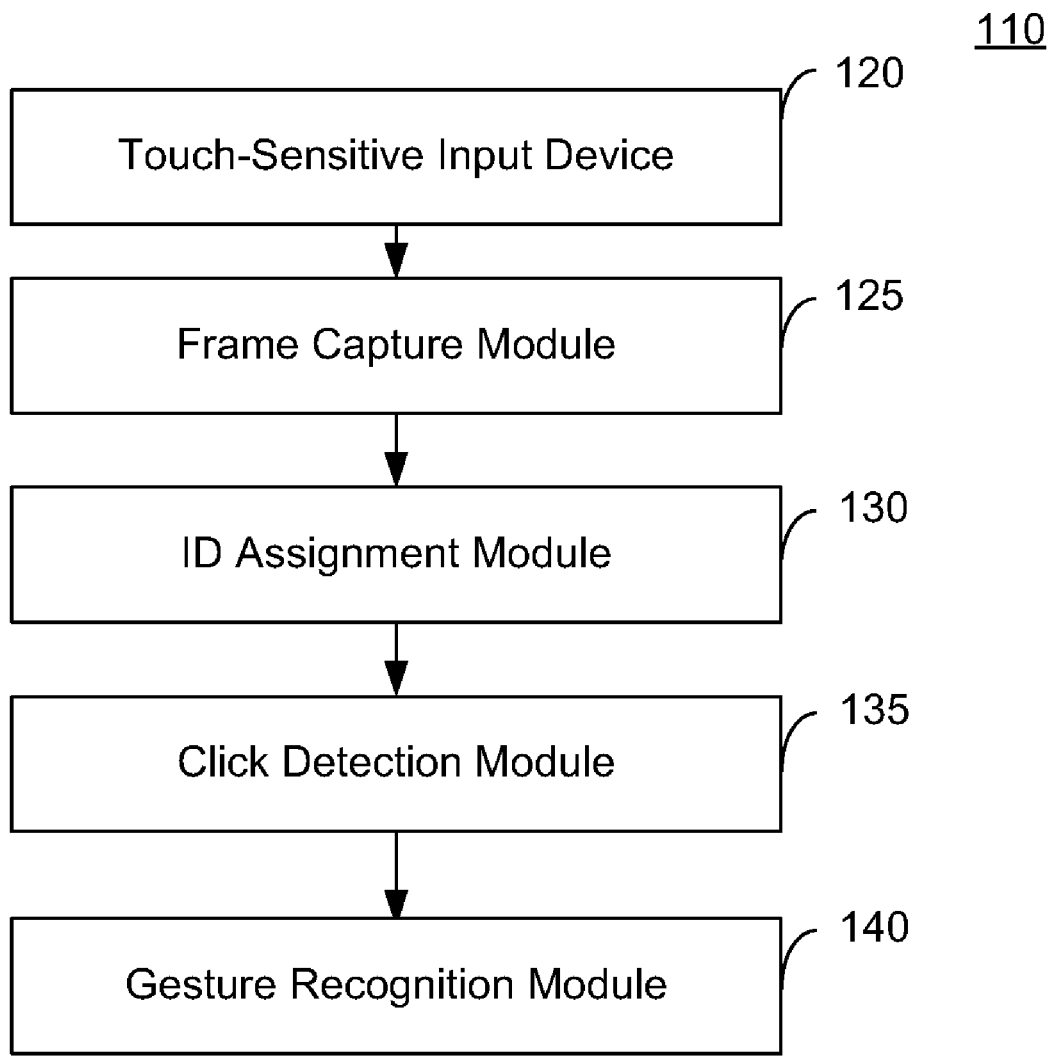
FIG. 1 is a conceptual diagram of an example system according to certain aspects of the disclosure.

FIG. 1 shows an example system 110 according to certain aspects of the disclosure. The system 110 includes a touch-sensitive input device 120, a frame capture module 125, an identification (ID) module 130, a click detection module 135, and a gesture recognition module 140. The touch-sensitive input device 120 may include a touch pad.

In one aspect, the input device 120 may detect one or more fingers on the surface of the input device 120, the position (e.g., (x,y) coordinates) of each finger on the surface of the input device 120, and a pressure of each finger, where the pressure may be defined as an area of contact with the surface of the input device 120. In one aspect, the frame capture module 125 may sequentially capture and output frames where each frame includes the detected position (e.g., (x,y) coordinates) and pressure (e.g., contact area) of each finger on the surface of the input device 120 at a given time instance. Each frame may include additional information, such as a sequential identifier to help maintain the correct sequence of frames. The frame capture module 125 may capture the frames at a rate of 80 frames per second, for example. However, the subject technology is not limited to this frame rate. The frame rate may vary depending on the manufacturer of the input device 120, the model of the input device 120, and/or other factors. The frame capture module 125 may output each captured frame to an ID module 130 for further processing, as discussed in more detail below.

In one aspect, the ID module 130 may be configured to assign an ID to each finger detected on the surface of the input device 120. When a new finger is detected in a frame, the ID module assigns a new ID to the user contact and identifies the finger in subsequent frames by its assigned ID. For each frame, the ID module 130 may associate each detected position (e.g., (x,y) coordinates) in the frame with the ID assigned to the corresponding finger.

The ID module 130 can distinguish between fingers and a palm or thumb according to some aspects of the disclosure. A thumb or palm can be reported differently from a finger or can be excluded from being reported. In one aspect, a thumb or palm is not counted as a finger by the ID module. Other approaches for reporting and otherwise handling thumbs and palms can be used.

The IDs allow the gesture recognition module 140 to identify which detected positions in different frames belong to the same finger, and therefore track the movements of a particular finger using its assigned ID. For example, the gesture recognition module 140 may use the ID assigned to a finger to determine the detected positions for the finger in two consecutive frames, and infer the movement of the finger between frames based on the detected positions. The gesture recognition module 140 may then translate the movement into a gesture (e.g., pointer movement, scroll, etc.). Thus, the IDs allow the gesture recognition module 140 to identify and track individual fingers on the surface of the input device 120.

Figure 2A:
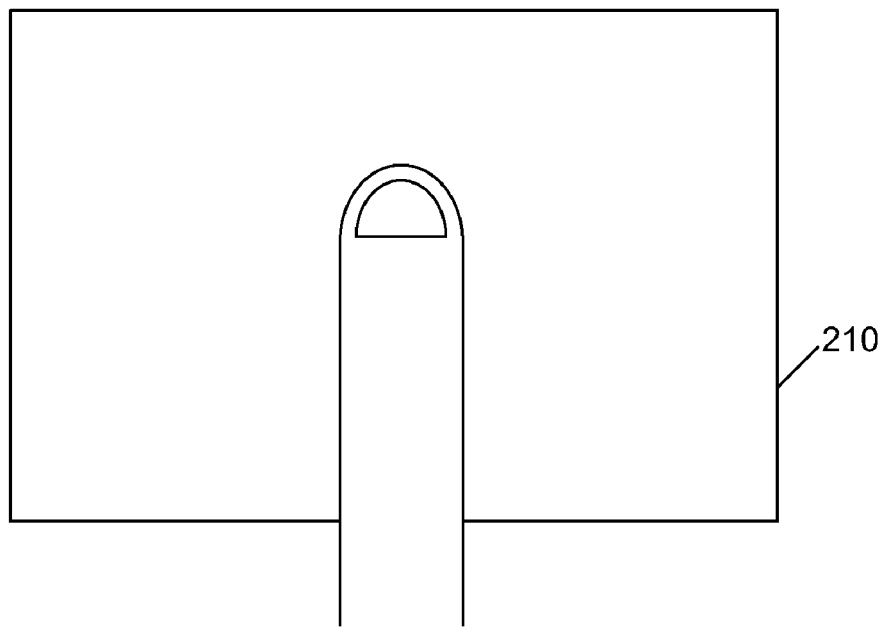
FIG. 2A shows an example of pushing down the surface of a touch-sensitive input device with one finger to perform a left click according to certain aspects of the disclosure.
Figure 2B:
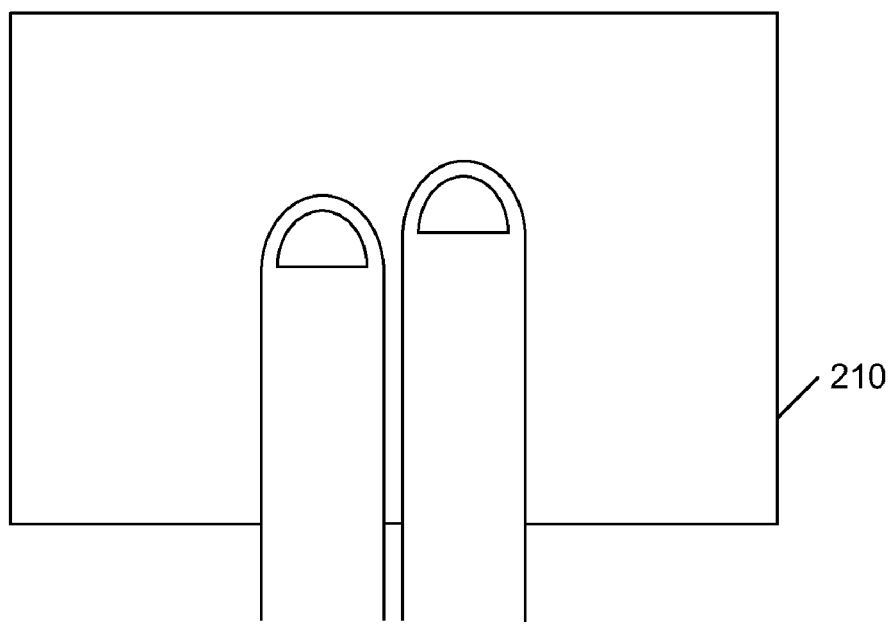
FIG. 2B shows an example of pushing down the surface of a touch-sensitive input device with two fingers to perform a right click according to certain aspects of the disclosure.

In one aspect, the user may push down the surface of the touch-sensitive input device 120 (e.g., touch pad) by applying sufficient downward force on the surface with one or more fingers. Thus, the surface of the input device 120 may act as a physical button that the user can push down to perform an operation (e.g., a click). For example, the user may push down the surface 210 of the input device 120 with one finger (shown in FIG. 2A) and allow the surface 210 to go back up to perform a left click. In another example, the user may push down the surface 210 of the input device 120 with two fingers (shown in FIG. 2B) and allow the surface 210 to go back up to perform a right click. In the present disclosure, the surface 210 of the input device 120 may be referred to as a physical button when used as a button.

A click may comprise two discreet actions: the physical button going down and then the physical button going back up. The number of fingers on the physical button when the physical button goes down may determine whether the click is a right click or a left click. For example, if two fingers are on the physical button when the physical button goes down, then a right button down is reported. Then, while the physical button remains down, one of the fingers is removed. In this case, when the physical button goes back up, a right button up is reported to be consistent with the right button down, and a right click is performed.

In one aspect, each frame may include an indicator (e.g., a bit) indicating whether the physical button (surface 210 of the input device 120) is down or up. The click detection module 135 may use this information and the number of fingers on the physical button (surface 210 of the input device 120) to detect a left click or a right click by the user. For example, when the current frame indicates that the physical button is down and the preceding frame indicates that the physical button is up, the click detection module 135 may determine the number of fingers in the current frame to detect a right button down or a left button down. If the current frame indicates that there are two fingers on the physical button, then the click detection module 135 may detect a right button down and report the right button down to the gesture recognition module 140. In this case, when the physical button goes back up, a right click is detected. If the current frame indicates that there is only one finger or no fingers on the physical button, then the click detection module 135 may detect a left button down and report the left button down to the gesture recognition module 140. In this case, when the physical button goes back up, a left click is detected.

However, the click detection module 135 may incorrectly detect a left click when the user intends a right click. This may occur, for example, when the user pushes down on the physical button (e.g., surface 210 of the input device 120) with two fingers from the air. In this example, the first frame indicating that the physical button is down may not show the fingers on the physical button. This is because the input device 120 may lag in reporting the fingers on the physical button relative to reporting that the physical button is down. As a result, the click detection module 135 may incorrectly detect a left click when the user intends a right click. In another example, when the user intends to push down the physical button with two fingers from the air, one of the fingers may reach the physical button before the other finger. In this example, the first frame indicating that the physical button is down may only show the first finger to reach the physical button. As a result, the click detection module 135 may incorrectly detect a left click when the user intends a right click.

To address this, the click detection module 135 may wait to report a right button down or a left button down for a short period of time (e.g., based on a preset threshold) after the physical button is first depressed. The click detection module 135 may use this time to receive additional information from one or more subsequent frames and to make a more reliable determination of whether the user is pushing down with one finger or with two fingers using the additional information.

The gesture recognition module 140 and/or the click detection module 135 can ignore a thumb or palm according to some aspects of the disclosure.

Figure 3:
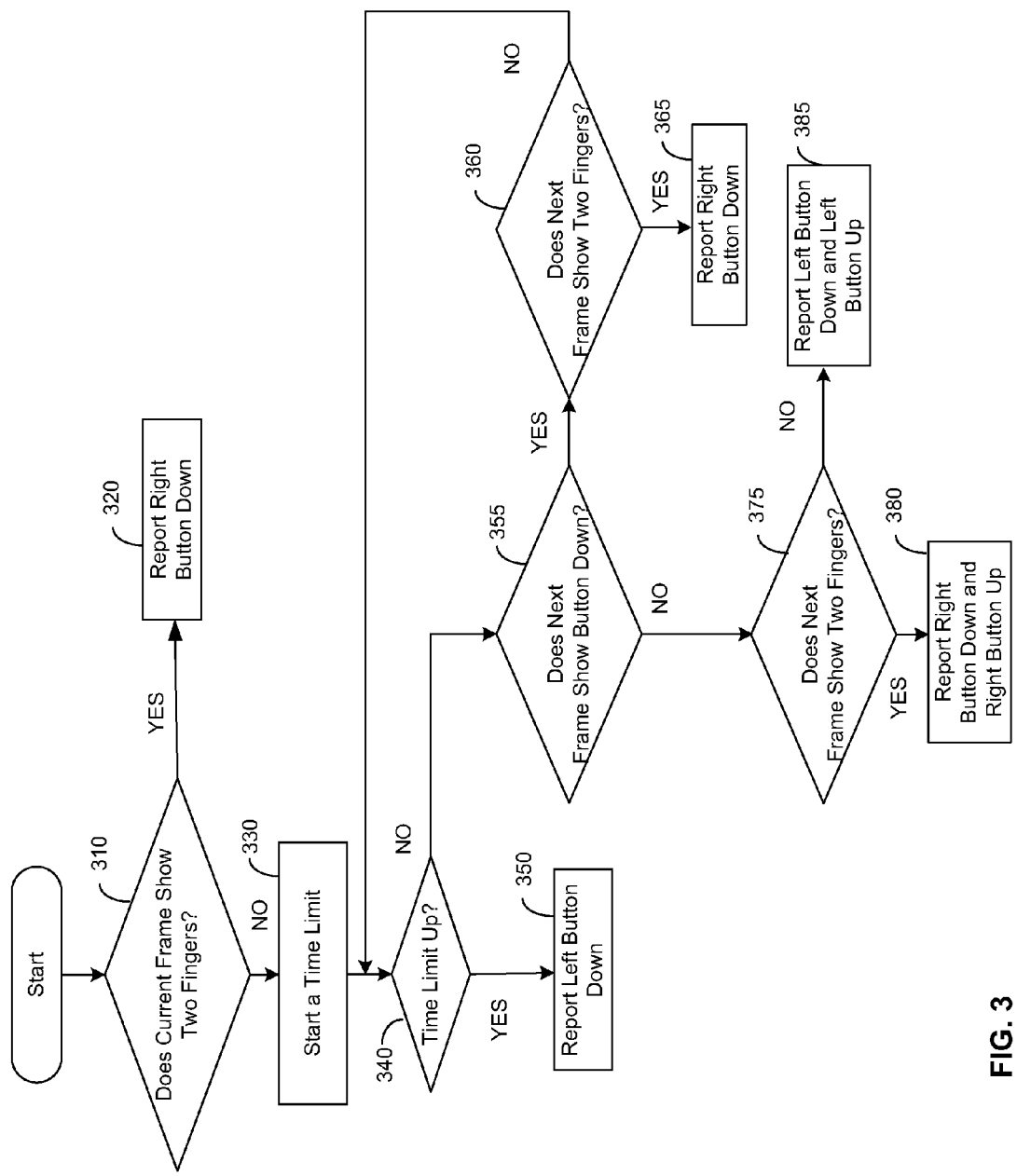
FIG. 3 is a flowchart of an example method of detecting a right click or a left click according to certain aspects of the disclosure.

FIG. 3 shows an example method that may be performed by the click detection module 135 for detecting a right click or a left click. The method starts when the click detection module 135 receives a first frame indicating that the physical button is down. This may occur when the current frame indicates that the physical button is down and the preceding frame indicates that the physical button is up.

In step 310, the click detection module 135 determines whether the current frame indicates two fingers on the physical button (surface 210 of the input device 120). If the current frame indicates two fingers, then the click detection module 135 reports a right button down in step 320. Otherwise, the click detection module 135 proceeds to step 330.

In step 330, the click detection module 135 starts a time limit (e.g., 30 milliseconds) for reporting a left button down or a right button down. The time limit may be empirically determined as the time needed for the click detection module 135 to receive enough information from one or more subsequent frames to reliably determine the user's intent.

In step 340, the click detection module 135 determines whether the time limit is up. If the time limit is up, then the click detection module 135 reports a left button down. This may occur, for example, when the physical button is still down and the click detection module 135 has not received a subsequent frame showing two fingers within the time limit. Otherwise, the click detection module 135 proceeds to step 355.

In step 355, the click detection module 135 determines whether the next frame indicates that the physical button is down. If the next frame indicates that the physical button is down, then the click detection module 135 proceeds to step 360. Otherwise, the click detection module 135 proceeds to step 375. Step 375 is performed when the next frame shows that the physical button is up.

In step 360, the click detection module 135 determines whether the next frame shows two fingers. If the next frame shows two fingers, then the click detection module 135 reports a right button down in step 365. Otherwise, the click detection module 135 returns to step 340. If a subsequent frame is received within the time limit, then the click detection module 135 may repeat steps 355-385 for the subsequent frame.

In step 375, the click detection module 135 determines whether the next frame shows two fingers. If the next frame shows two fingers, then the click detection module 135 reports a right button down and a right button up in step 380. The click detection module 135 reports a right button up because the physical button is back up when step 375 is performed. Otherwise, the click detection module 135 reports a left button down and a left button up in step 385.

In the above example, the click detection module 135 may report a right button down before the time limit expires if a subsequent frame within the time limit shows that the button is down and shows two fingers. The click detection module 135 may also report a right button down or a left button down before the time limit expires if a subsequent frame within the time limit shows that the button is up. In this case, the click detection module 135 may report a right button down and a right button up if the subsequent frame shows two fingers and report a left button down and a left button up if the subsequent shows one finger or no fingers.

In one aspect, the click detection module 135 may not make a determination of whether a button down is a right button down or a left button down until the time limit expires. Also, aspects of the subject technology may be used to resolve ambiguity between more than two states (e.g., left click vs. right click). For example, the subject technology may be used to resolve ambiguity between three or more three different types of clicks or other gestures.

According to one aspect of the disclosure, a physical button down can be detected without a finger being detected. For example, the physical button down can be caused by a thumb or palm, which in some aspects can be excluded from being shown as a finger. According to another aspect, a different time limit can be applied to different numbers of detected fingers. For example, a different time limit can be applied to no fingers detected, one finger detected, and two fingers detected. When a time limit for a number of detected fingers expires, the click detection module can report a button action based on a number of fingers shown in a next frame.

In a further aspect, different time limits can be used when resolving ambiguity between more than two states. For example, four possible states include but are not limited to a click with no fingers, a click with one finger, a click with two fingers, and a click with three fingers, each of which can represent different button actions according to some aspects of the disclosure. A button action can also be represented by two different numbers of detected fingers. For example, both a click with no fingers (e.g., with a palm or thumb) and a click with one finger can represent a left button down action. For another example, both a click with two fingers and a click with three fingers can represent a right button down action. Aspects of the disclosure are not limited to these examples.

Figure 4:
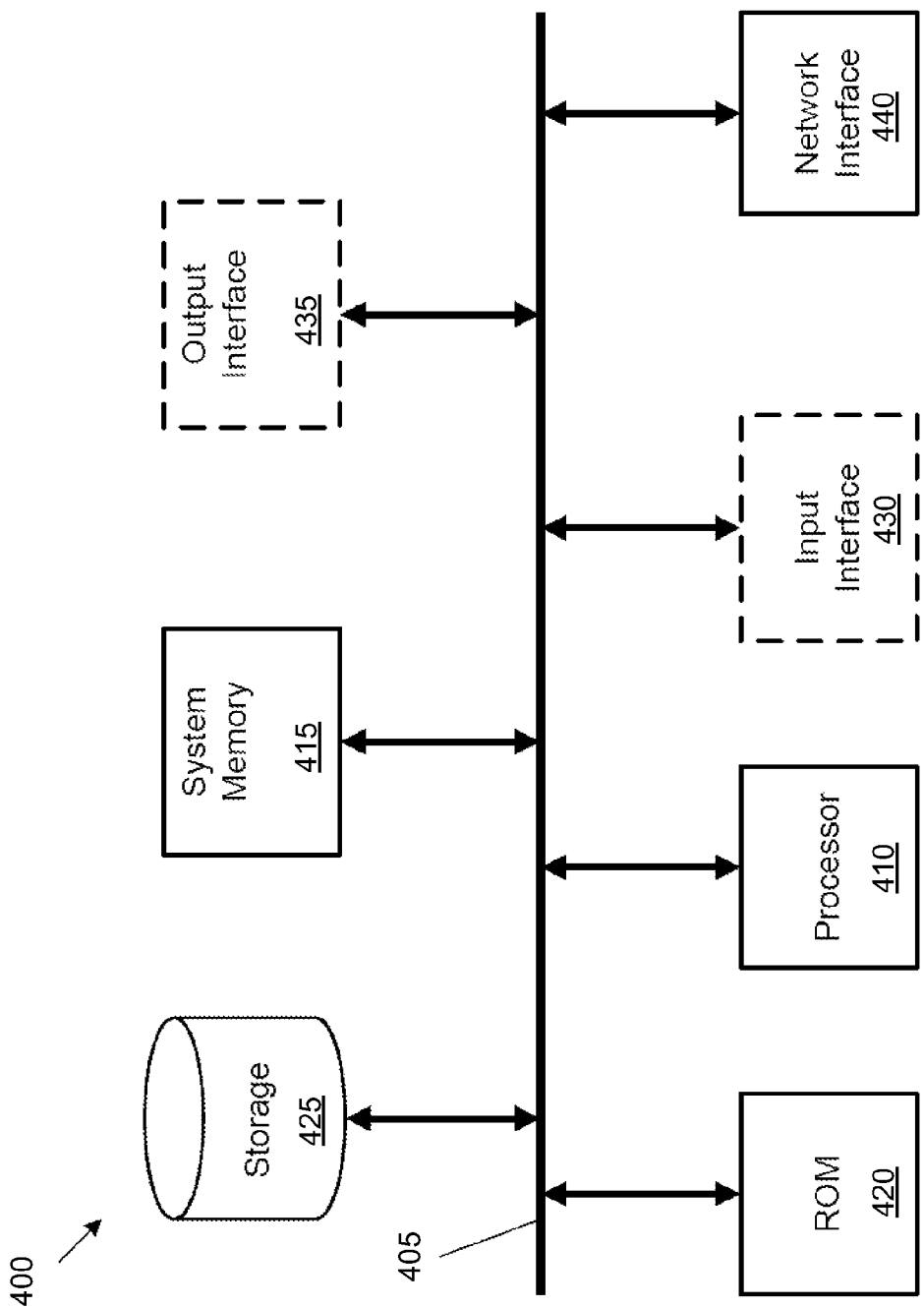
FIG. 4 is a block diagram illustrating an example computer system with which the system of FIG. 1 can be implemented.

FIG. 4 illustrates an example computing system 400 with which some implementations of the subject technology may be implemented. The system 400 can be a computer, a phone, a PDA, a tablet, or any other sort of electronic device. Such a system 400 includes various types of computer readable media and interfaces for various other types of computer readable media. The system 400 may include a bus 405, processing unit(s) 410, a system memory 415, a read-only memory 420, a storage device 425, an input interface 430, an output interface 435, and a network interface 440.

The bus 405 collectively represents all system, peripheral, and chipset buses that communicatively connect the numerous internal devices of the system 400. For instance, the bus 405 communicatively connects the processing unit(s) 410 with the read-only memory 420, the system memory 415, and the storage device 425.

From these various memory units, the processing unit(s) 410 may retrieve instructions and execute the instructions to perform various functions described above. For example, the processing units(s) may execute instructions to perform the functions of the various modules illustrated in FIG. 1. The processing unit(s) can be a single processor or a multi-core processor in different implementations.

The read-only-memory (ROM) 420 may store static data and instructions that are needed by the processing unit(s) 410 and other modules of the system 400. The storage device 425, on the other hand, may be a read-and-write memory device. This device may comprise a non-volatile memory unit that stores instructions and data even when the system 400 is powered down. Some implementations of the invention may use a mass-storage device (such as a magnetic or optical disk and its corresponding disk drive) as the storage device 425.

Other implementations may use a removable storage device (such as a flash drive, a floppy disk, and its corresponding disk drive) as the storage device 425. The system memory 415 may be a volatile read-and-write memory, such as a random access memory. The system memory 415 may store some of the instructions and data that the processor needs at runtime. In some implementations, instructions for executing various processes described above may be stored in the system memory 415, the storage device 425, and/or the read-only memory 420.

The bus 405 may also connect to the input interface 430 and the output interface 435. The input interface 430 may include the touch-sensitive input device 120. The output interface 435 can provide display images generated by the system 400. The optional output interface 435 can interface with printers and display devices, such as cathode ray tubes (CRT) or liquid crystal displays (LCD). Some implementations can interface with devices such as a touchscreen that functions as both input and output devices.

The bus 405 may also couple the system 400 to a network interface 440 through a network adapter (not shown). In this manner, the computer can be a part of a network of computers (such as a local area network ("LAN"), a wide area network ("WAN"), or an Intranet, or an interconnected network of networks, such as the Internet. Any or all components of system 400 can be used in conjunction with the invention.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

These and other implementations are within the scope of the following claims.

What is claimed is:

1. A computer-implemented method of reporting button actions generated using a touch-sensitive input device, comprising:
    determining that a surface of the touch-sensitive input device is pushed down;
    detecting a number of fingers on the surface of the touch-sensitive input device after the surface is pushed down;
    reporting, in a case where the number of fingers detected on the surface of the touch-sensitive input device is two, a first button down action;
    waiting, in a case where the number of fingers detected on the surface of the touch-sensitive input device is one, until a period of time has elapsed or the surface is no longer pushed down; and
    reporting the button actions based on the number of fingers detected on the surface of the touch-sensitive input device during or after the step of waiting;
    wherein reporting the button actions comprises:
        determining, before the period of time has elapsed, that the surface of the touch-sensitive input device is no longer pushed down; and
        reporting the button actions based on the number of fingers detected on the surface of the touch-sensitive input device after the touch-sensitive input device is no longer pushed down; and
    wherein reporting the button actions based on the number of fingers detected on the surface of the touch-sensitive input device after the touch-sensitive input device is no longer pushed down comprises:
        detecting the number of fingers on the surface of the touch-sensitive input device after the touch-sensitive input device is no longer pushed down;
        reporting the first button down and up action in a case where the number of fingers detected on the surface of the touch-sensitive input device after the touch-sensitive input device is no longer pushed down is two; and
        reporting a second button down and up action in a case where the number of fingers detected on the surface of the touch-sensitive input device after the touch-sensitive input device is no longer pushed down is one.

2. The computer-implemented method of claim 1, wherein the period of time comprises multiple frames, and wherein the step of detecting the number of fingers on the surface of the touch-sensitive input device is repeated for each frame until the period of time has elapsed or the surface is no longer pushed down.

3. The computer-implemented method of claim 2, wherein reporting the button actions further comprises reporting the first button down action in a case where the number of fingers detected on the surface of the touch-sensitive input device for one of the frames is two.

4. The computer-implemented method of claim 2, wherein reporting the button actions further comprises reporting the second button down action in a case where the period of time has elapsed and the number of fingers detected on the surface of the touch-sensitive input device for all of the frames during the period of time was one.

5. The computer-implemented method of claim 1, wherein
    reporting the first button down and up action in a case where the number of fingers detected on the surface of the touch-sensitive input device after the touch-sensitive input device is no longer pushed down is two comprises reporting a right button down action; and
    wherein reporting the second button down and up action in a case where the number of fingers detected on the surface of the touch-sensitive input device after the touch-sensitive input device is no longer pushed down is one comprises reporting a left button down action.

6. A non-transitory machine-readable storage medium comprising machine-readable instructions for causing a processor to execute a method of reporting button actions generated using a touch-sensitive input device, the method comprising:
    determining that a surface of the touch-sensitive input device is pushed down;
    detecting a number of fingers on the surface of the touch-sensitive input device after the surface is pushed down;
    reporting, in a case where the number of fingers detected on the surface of the touch-sensitive input device is two, a first button action;
    waiting, in a case where the number of fingers detected on the surface of the touch-sensitive input device is one, until a period of time has elapsed or the surface of the touch-sensitive input device is no longer pushed down; and
    reporting the button actions based on the number of fingers detected on the surface of the touch-sensitive input device during or after the step of waiting;
    wherein reporting the button actions comprises:
        determining, before the period of time has elapsed, that the surface of the touch-sensitive input device is no longer pushed down; and
        reporting the button actions based on the number of fingers detected on the surface of the touch-sensitive input device after the touch-sensitive input device is no longer pushed down; and
    wherein reporting the button actions based on the number of fingers detected on the surface of the touch-sensitive input device after the touch-sensitive input device is no longer pushed down comprises:
        detecting the number of fingers on the surface of the touch-sensitive input device after the touch-sensitive input device is no longer pushed down;

reporting the first button action in a case where the number of fingers detected on the surface of the touch-sensitive input device after the touch-sensitive input device is no longer pushed down is two and reporting a second button action in a case where the number of fingers detected on the surface of the touch-sensitive input device after the touch-sensitive input device is no longer pushed down is one.

7. The non-transitory machine-readable storage medium of claim 6, wherein the period of time comprises multiple frames, and wherein the step of detecting the number of fingers on the surface of the touch-sensitive input device is repeated for each frame until the period of time has elapsed or the surface is no longer pushed down.

8. The non-transitory machine-readable storage medium of claim 7, wherein reporting the button actions further comprises reporting the first button action in a case where the number of fingers detected on the surface of the touch-sensitive input device for one of the frames is two.

9. The non-transitory machine-readable storage medium of claim 7, wherein reporting the button actions further comprises reporting the second button action in a case where the period of time has elapsed and the number of fingers detected on the surface of the touch-sensitive input device for all of the frames during the period of time was one.

10. The non-transitory machine-readable storage medium of claim 6, wherein reporting the first button action in a case where the number of fingers detected on the surface of the touch-sensitive input device after the touch-sensitive input device is no longer pushed down is two comprises reporting two button actions; and wherein reporting the second button action in a case where the number of fingers detected on the surface of the touch-sensitive input device after the touch-sensitive input device is no longer pushed down is one comprises reporting two button actions.

11. A system for reporting gestures corresponding to use of a touch-sensitive input device, the system comprising:

the touch-sensitive input device; and a processing unit configured to perform comprising:

determining that a surface of the touch-sensitive input device is pushed down;

detecting a number of fingers on the surface of the touch-sensitive input device after the surface is pushed down;

reporting, in a case where the number of fingers detected on the surface of the touch-sensitive input device is two, a first gesture;

waiting, in a case where the number of fingers detected on the surface of the touch-sensitive input device is one, until a period of time has elapsed or the surface is no longer pushed down; and reporting the gestures based on the number of fingers detected on the surface of the touch-sensitive input device during or after the step of waiting;

wherein the reporting the gestures comprises:

determining, before the period of time has elapsed, that the surface of the touch-sensitive input device is no longer pushed down; and reporting the gestures based on the number of fingers detected on the surface of the touch-sensitive input device after the touch-sensitive input device is no longer pushed down; and wherein the reporting the gestures based on the number of fingers detected on the surface of the touch-sensitive input device after the touch-sensitive input device is no longer pushed down comprises:

detecting the number of fingers on the surface of the touch-sensitive input device after the touch-sensitive input device is no longer pushed down;

reporting the first gesture in a case where the number of fingers detected on the surface of the touch-sensitive input device after the touch-sensitive input device is no longer pushed down is two; and reporting a second gesture in a case where the number of fingers detected on the surface of the touch-sensitive input device after the touch-sensitive input device is no longer pushed down is one.

12. The system of claim 11, wherein the period of time comprises multiple frames, and wherein the operations further comprise repeating detecting the number of fingers on the surface of the touch-sensitive input device for each frame until the period of time has elapsed or the surface is no longer pushed down.

13. The system of claim 12, wherein the reporting the gestures comprises reporting the first gesture in a case where the number of fingers detected on the surface of the touch-sensitive input device for one of the frames is two.

14. The system of claim 12, wherein the reporting the gestures comprises reporting the second gesture in a case where the period of time has elapsed and the number of fingers detected on the surface of the touch-sensitive input device for all of the frames during the period of time was one.

15. The system of claim 11, wherein reporting the first gesture in a case where the number of fingers detected on the surface of the touch-sensitive input device after the touch-sensitive input device is no longer pushed down is two comprises reporting two gestures; and reporting the second gesture in a case where the number of fingers detected on the surface of the touch-sensitive input device after the touch-sensitive input device is no longer pushed down is one comprises reporting two gestures.

* * * * *

UNITED STATES PATENT AND TRADEMARK OFFICE
CERTIFICATE OF CORRECTION

| | |
|---|---|
| PATENT NO. | : 8,390,593 B2 |
| APPLICATION NO. | : 13/447118 |
| DATED | : March 5, 2013 |
| INVENTOR(S) | : Andrew De Los Reyes et al. |

It is certified that error appears in the above-identified patent and that said Letters Patent is hereby corrected as shown below:

In the Claims

Column 9, line 4, in claim 6, delete "two" and insert -- two; --, therefor.

Column 9, line 42, in claim 11, delete "perform" and insert -- perform operations --, therefor.

Signed and Sealed this
Third Day of June, 2014

Michelle K. Lee
*Deputy Director of the United States Patent and Trademark Office*